United States Patent Office 3,436,376
Patented Apr. 1, 1969

3,436,376
POLYESTERS
Irl N. Duling, West Chester, Pa., assignor to Sun Oil Company, Philadelphia, Pa., a corporation of New Jersey
No Drawing. Continuation-in-part of application Ser. No. 303,405, Aug. 20, 1963. This application May 19, 1967, Ser. No. 639,635
Int. Cl. C08g *17/08*
U.S. Cl. 260—75      4 Claims

ABSTRACT OF THE DISCLOSURE

Polyester compositions resulting from the reaction of naphthalene dicarboxylic acid and 1,2-propane diol.

CROSS REFERENCES TO RELATED APPLICATIONS

This application is a continuation-in-part of copending application Ser. No. 303,405 filed Aug. 20, 1963, now abandoned, which discloses and claims polyesters prepared from naphthalene dicarboxylic acids and 1,2-propane diol.

BACKGROUND OF THE INVENTION

This invention relates to novel polyesters, fibers and films prepared therefrom and method of preparing the same. More particularly, this invention relates to polyesters having unique and unexpected beneficial properties prepared from naphthalene dicarboxylic acids or esters thereof and 1,2-propane diol.

Polyesters prepared from aromatic dicarboxylic acids and glycols are well known in the art. Conventionally, however, certain prior art polymers had inherent disadvantages which included (1) low glass transition points, (2) crystallizability when swollen by solvents such as ethanol, acetone or benzene, (3) low softening points, and (4) opacity. Apparently the classic method to overcome certain of these problems has been to incorporate a third reactive ingredient in the polymer such as those described in U.S. Patents Nos. 2,098,964, 2,936,296, and 3,008,934.

SUMMARY OF THE INVENTION

A polyester composition has now been found which possesses few of the disadvantages of prior art polyesters and unexpectedly possesses properties which are superior to those prepared using three or more reactants to form the polyesters.

Briefly stated the instant invention comprises polyesters having the following general formula:

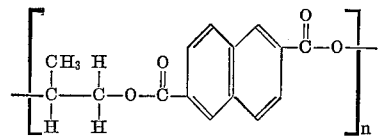

wherein $n$ is an integer of from 10 to 100, preferably 50 to 75. These novel polyesters are prepared from naphthalene dicarboxylic acids or esters thereof and 1,2-propane diol.

DESCRIPTION

Naphthlene dicarboxylic acids can be prepared by a number of various methods. One such method involves the oxidation of dimethylnaphthalene isomers obtainable from a cracked petroleum fraction of appropriate boiling range by a solvent extraction with furfural or by azeotropic distillation with diethylene glycol.

The oxdiation of the dimethylnaphthalene isomers can be performed utilizing molecular oxygen (e.g., air) at temperatures in the range of 100°–250° C. in the presence of a catalyst system comprising a heavy metal oxidation catalyst and elemental bromine or a bromine compound. This type of oxidation process has been described in Saffer et al., U.S. Patent No. 2,833,816. By way of example, 2,6-dimethylnaphthalene can be converted to the corresponding diacid by contacting an aectic acid solution of the dimethylnaphthalene containing a cobalt acetate-amomnium bromide cocatalyst with molecular oxygen at a temperature in the range of 110–135° C.

Another suitable procedure for converting dimethylnaphthalene, particularly 2,6-dimethylnaphthalene, to the corresponding dicarboxylic acid involves the use of nitrogen dioxide ($NO_2$) in combination with selenium. This procedure involves dissolving the dimethylnaphthalene in an inert solvent such as trichlorobenzene, adding a small amount of selenium to the mixture and contacting the mixture in liquid phase with gaseous $NO_2$ at a temperature above 140° C., preferably in the range of 180°–225° C. This procedure is capable of producing the diacid in a yield generally in excess of 80% of the theoretical.

As stated above, the novel polymers of this invention are prepared from naphthalene dicarboxylic acids or esters thereof and 1,2-propane diol. The preferred polymers of this invention are those prepared from the dimethyl ester of naphthalene-2,6-dicarboxylic acid and 1,2-propane diol by a transesterification reaction.

The general formula for the preferred polymers is as follows:

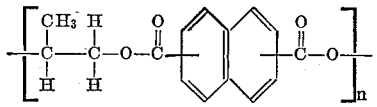

wherein $n$ is as defined hereinabove. It will be understood that $n$ represents the number of times the above shown monomeric unit recurs and is calculated by determining the molecular weight of the polymer and dividing by 258 (the molecular weight of the monomer shown above).

A transesterification, or as it is sometimes called—an ester interchange—method for preparing polyesters is well known. This method of preparation generally proceeds as follows:

(a) The ester and glycol reactants are heated in the presence of a catalyst. A monohydric alcohol is concurrently distilled off.

(b) As the temperature is raised, polymerization is incited and the excess glycol is distilled off.

(c) The polymerization is completed by removing the last traces of unreacted glycol by reducing the pressure on the system.

In the preferred embodiment of the instant invention a mixture of the dimethyl ester of naphthalene-2,6-dicarboxylic acid and 1,2-propane diol, wherein the molar ratio of ester to diol is in the range of from 1:10 to 1:1.5, preferably 1:4 to 1:2, is added to any suitable reaction vessel. The reaction vessel can be of any suitable material such as glass, stainless steel or any of the other metals commonly employed in processing polyester resins. A catalyst condensing agent is added to the reaction mass. The reaction mixture is then heated at a temperature in the range of from 150° C. to 225° C., preferably 175° C. to 200° C. at atmospheric pressure in a nitrogen atmosphere for a period of time in the range of from 2 hours to 6 hours. During this time methyl alcohol will be distilled from the reaction mixture. Polymerization is initiated by slowly raising the temperature to between 200° C. and 400° C., preferably 230° C. to 290° C. over a period of time of 0.5 to 2.0 hours. During the continuance of the polymerization at the temperature for an additional 0.5 to 3.0 hours, any unreacted excess 1,2-propanediol is distilled from the reaction mixture. The pressure is then slowly reduced, on the system to below 5 mm. over a period of time of 0.5 to 4.0 hours, followed by continued heating at the elevated temperature and reduced pressure for an additional 2 to 6 hours. In this latter step the last traces of the glycol are distilled off and the reaction mixture becomes progressively more viscous.

The specific temperatures and heating periods may vary over wider ranges than those outlined above depending on the observed rate of reaction. In cases where reaction becomes sluggish, higher temperature and/or longer periods of time can be employed. In those cases where the polymer is solidified, or begins to solidify before it is apparent all glycol has been removed, the temperature and/or the heating period are increased. The conditions can be varied considerably depending upon the degree of the polyesterification desired, the ultimate properties sought, stability of the polyester being produced and use for which the product is intended. When the desired viscosity is reached under the above-described conditions, evacuation and heating are discontinued, the vessel allowed to cool to approximately room temperature, and the polyester removed.

In theory a total of only one mole of the glycol is necessary to effect complete polyesterification with one mole of the diester. However, in practice, it is difficult to attain complete reaction under these conditions. It is therefore usually necessary to utilize an excess of the glycol, preferably at least two moles of glycol to one mole of diester. Quantities, substantially larger than about 2 moles of the glycol can be used; however, since they are not necessary, in the interests of economy, they are not recommended.

The catalytic condensing agents which can be employed are conventional ester-interchange catalysts and include, for example, the alkali metals; the alkaline earth metals; the oxides, carbonates, and borates of these two groups of metals; the one to six carbon alkoxides of these two groups of metals; magnesium, zinc, and manganese; the oxides of these metals; zinc borate; the sulfates, phosphates and acetates of zinc, cadmium, magnesium, aluminum and copper; litharge or a combination of litharge with antimony trioxide or pentoxide and triphenyl phosphite as described in U.S. Patent No. 2,650,213; compounds of the formula:

$$M[Al(OR)_4]$$

wherein M is an alkali metal, e.g., lithium, sodium, or potassium, and R is an alkyl radical containing from 1 to 6 carbon atoms; R can be derived from a lower aliphatic alcohol such as methyl, ethyl, propyl, n-butyl, isobutyl, n-amyl, etc., as described in U.S. 2,720,506; a composition consisting of lithium hydride and a glycol-soluble organic salt of cadmium, magnesium or zinc as described in U.S. Patent No. 2,681,360.

From about 0.005% to about 0.2% of such catalysts based on the weight of naphthalene dicarboxylic acid or ester being condensed can be employed. Higher or lower percentages can also be employed. Generally, from about 0.01% to about 0.05% of the catalytic condensing agent can be advantageously employed, based on the weight of diacid or diester. As will be apparent to those skilled in the art, it is generally advantageous from a cost standpoint to utilize the minimum quantity of one of the above catalysts which effects optimum results. Obviously, however, quantities larger or smaller than those outlined above will be employed by those skilled in the art where needed, e.g., to accelerate or to decelerate rate of reaction, to modify properties such as luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sufolane, etc. It is essential to exclude oxygen and moisture at all stages of the condensation reaction. Otherwise discoloration, low molecular weight, and/or insolubilization of the polyester results. Inert atmospheres which can advantageously be employed include nitrogen, hydrogen, helium, etc. The exclusion of moisture is readily effected by employing substantially anhydrous reactants.

Discoloration and low molecular weight products are also avoided by the utilization of essentially pure reagents. Since the dimethyl ester is easier to purify than is the naphthalene dicarboxylic acid, the esters are the preferred starting materials. The molecular weight of the polymer can be stabilized by the addition of a "short stopping agent" such as an aliphatic monohydric alcohol or monobasic acid having from 1 to 6 carbon atoms.

The polyesters of this invention can be produced by continuous methods; for example, the required amounts of the several reactants and catalyst can be continuously metered into the reaction vessel, maintained therein for the required reaction time under the required reaction conditions of temperature and pressure and then continuously drawn off.

The polyesters of this invention can be formed into filaments or films by conventional melt extrusion procedures. For example, the polyesters can be melt extruded vertically at a melt temperature of approximately 25° C. above the melting point of the polyester coupled with immediate quenching with subsequent orientating.

Films, fibers or molded objects prepared from the polyesters of this invention possess, among others, the following superior properties: (1) amorphousness, (2) transparency, (3) high softening point, (4) pliability, and (5) high glass transition points.

The following examples further illustrate the instant invention.

EXAMPLE I

Preparation of naphthalene-2,6-dicarboxylic acid

The apparatus consists of a 3-liter flask fitted with a stirrer and having baffles along the sides to give effective agitation. Inlets are provided for the introduction of NO₂ and a solution of the 2,6-dimethylnaphthalene, reaching to near the bottom of the flask. A reflux or other condenser attached to the top returns condensed vapor (other than water) to the flask. An overflow outlet near the top permits the exit of the oxidized mixture for further processing.

Into the flask there were placed 10 gm. of selenium and 2,000 cc. of trichlorobenzene. The mixture was heated to 105° C. NO₂ was introduced to oxidize the selenium. 100 gm. of 2,6-dimethylnaphthalene were added which immediately caused the selenium dioxide to be reduced to selenium as evidenced by the disapperance of the solid selenium dioxide slurry and the formation of a clear red solution.

NO₂ gas was introduced at the rate of 1.5 to 1.6 gm. per minute until 24 gm. of condensed water were collected from the exit gases. The temperature was permitted to rise from 185° C. to 200° C. at the end of the reaction. The exit gases were essentially colorless showing practically complete reduction of the NO₂ to NO.

The contents of the flask were cooled; the solids separated by filtration, washed successively with isooctane and water, and dried. The product weighed 111 gm. and had a neutralization equivalent of 154.

EXAMPLE II

Preparation of Dimethyl Ester of Naphthalene-2,6-Dicarboxylic Acid

Into a glass lined reactor there were placed 100 gm. of the diacid as prepared in Example I, 750 gm. of methanol, and 10 gm. of 80% sulfuric acid. The mixture was heated with agitation to a temperature of 130° C. An autogenous pressure of 150 p.s.i.g. was developed. The reaction mixture was maintained at the above conditions for 4 hours after which the mixture was allowed to cool to ambient temperatures and was separated by means of a centrifuge. The solid fraction was reslurried with methanol in a weight ratio of 2:1 methanol:solids. The resulting mixture was separated by means of a centrifuge and the solid fraction was dried in an air oven at 60° C. to a 1% maximum residual methanol content. The dried material was identified as the dimethyl ester of naphthalene-2,6-dicarboxylic acid by its melting point of 190°–193° C., its infrared spectra and elemental analysis.

EXAMPLE III

Formation of Polyester

To a mixture of 30 gm. of diester prepared as in Example II and 30 cc. of redistilled 1,2-propane diol, there was added 0.006 gm. zinc oxide and 0.0105 gm. antimony pentoxide. The mixture was heated in an atmosphere of nitrogen at a temperature of 190°–195° C. for 4.75 hours. During this time, 18.1 cc. of methyl alcohol was distilled from the mixture.

The temperature was increased to 230° C. over a 2 hour period. During this time 12.6 cc. unreacted 1,2-propane diol were distilled off.

To insure as complete a removal of unreacted diol as possible, the pressure on the system was reduced over an 0.5 hour period to about 1 mm. These conditions were maintained for about 2 hours. The mixture was cooled and there was recovered about 30 gm. of a polymeric product which had a softening point of 90°–100° C. and could be drawn into a monofilament. The polymer had a glass transition point of 88° C. Due to the high glass transition point, when the polymer is used in the form of a supported film, such as a surface coating, upon the application thereto of a hot dish or beaker, the surface is less easily marred than is a conventional polyester surface coating having a glass transition point of only about 65° C.

EXAMPLE IV

Formation of Polyesters

A series of polyesters were prepared in accordance with the method set forth in Example III. All conditions and reactants were identical therewith with the exception that various glycols were substituted for the 1,2-propane diol employed in Example III. The glycols used ethylene glycol, 1,3-propane glycol, 1,4-butane glycol, 1,5-pentane glycol, 1,6-hexane glycol and 1,10-decane glycol. The crystallinity of each polymer was determined as well as the melting points and glass transition points thereof. The data obtained are set forth in the table.

POLYESTERS PREPARED FROM DIMETHYL-2,6-NAPHTHALENE DICARBOXYLATE

| No. | Glycol | Polymer properties | | |
|---|---|---|---|---|
| | | Crystalline | M.P. | Glass trans. pt. |
| 1 | HO(CH$_2$)$_2$OH | Yes | 260 | 110 |
| 2 | HO(CH$_2$)$_3$OH | Yes | 216 | 73 |
| 3 | HO(CH$_2$)$_4$OH | Yes | 246 | 76 |
| 4 | HO(CH$_2$)$_5$OH | Yes | 128 | 38 |
| 5 | HO(CH$_2$)$_6$OH | Yes | 216 | 44 |
| 6 | HO(CH$_2$)$_{10}$OH | Yes | 144 | 14 |

The data presented in the above table clearly demonstrate the unexpected properties obtained with the polymers of the instant invention. For example, the polymers of the instant invention are not crystalline whereas all of the other polymers are crystalline. The polymers of the instant invention have a softening point range of about 100° less than that which would be expected from a polymer prepared using a 1,3-propane diol (compare No. 2 with the polyester prepared in Example III). In addition the polymers of the instant invention have a glass transition point of about 15° C. higher than that which would be expected (compare No. 2 with the polyester prepared in Example III).

Substantially identical results are obtained as those stated above when other naphthalene diacids are used in place of naphthalene-2,6-dicarboxylic acid.

I claim:

1. A polymeric polyester consisting essentially of repeating units of the general formula:

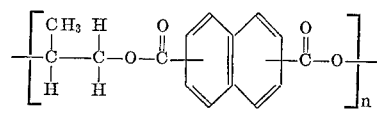

wherein $n$ is an integer of from 10 to 100.

2. Polyesters in accordance with claim 1 wherein $n$ is an integer of from 50 and 75.

3. Polyesters in accordance with claim 4 wherein $n$ is an integer of from 50 to 75.

4. A polymeric polyester consisting essentially of repeating units of the general formula:

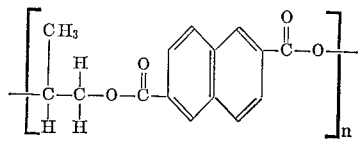

wherein $n$ is an integer of from 10 to 100.

References Cited

UNITED STATES PATENTS

| 2,823,231 | 2/1958 | Raecke et al. | 260—75 XR |
| 2,962,469 | 11/1960 | Phillips et al. | |
| 3,110,547 | 11/1963 | Emmert | 260—75 |

FOREIGN PATENTS 604,073  6/1948  Great Britain.

OTHER REFERENCES

Hill: Fibres From Synthetic Polymers, Elsevier Polymer Series, vol. 6 London, Elsevier Publishing Co., 1953, pp. 150, 151, 156.

WILLIAM H. SHORT, *Primary Examiner.*

LOUISE P. QUAST, *Assistant Examiner.*